M. H. TUTTLE.
TIRE TOOL.
APPLICATION FILED MAY 31, 1918.
1,302,734.
Patented May 6, 1919.
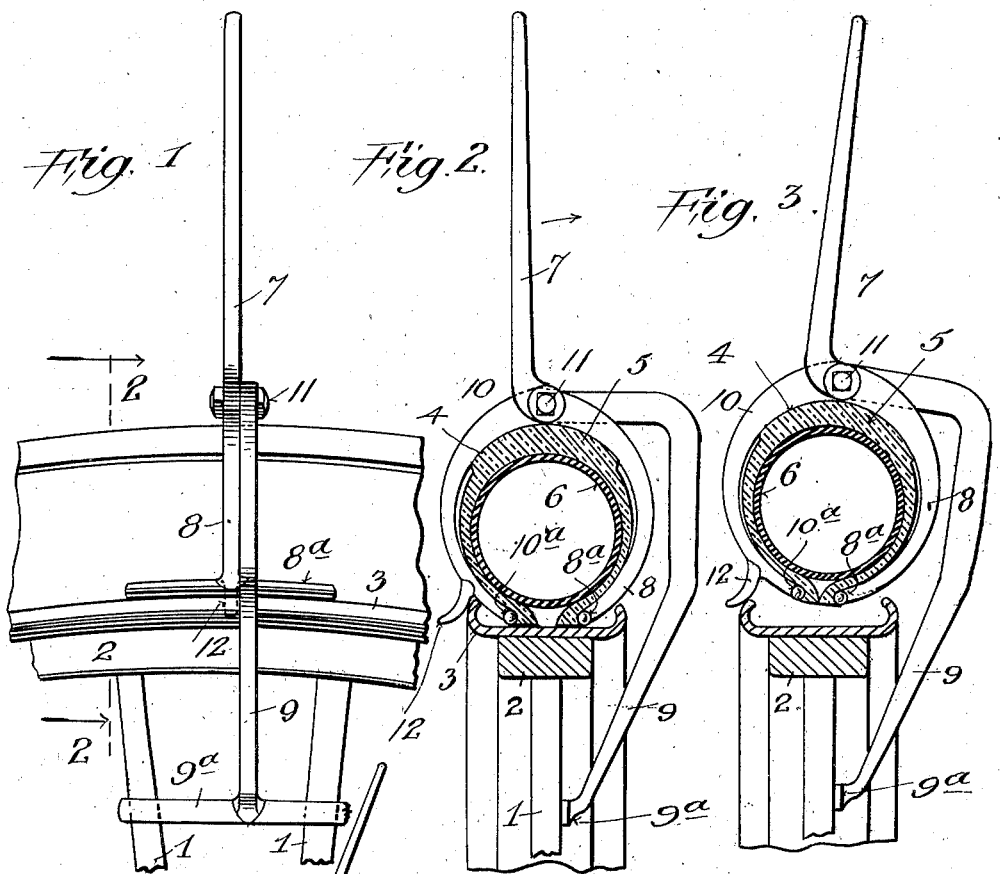
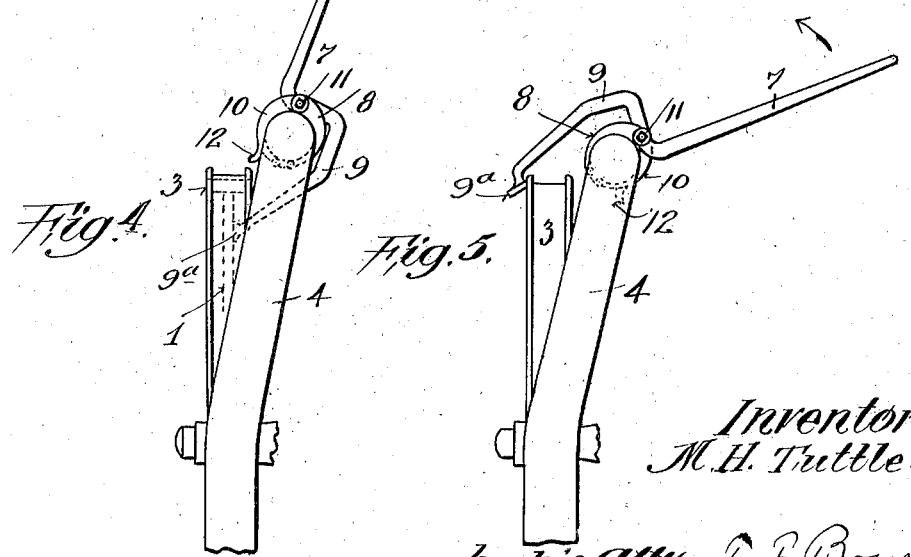
Inventor
M. H. Tuttle.
by his atty T. F. Bourne

UNITED STATES PATENT OFFICE.

MONTAGUE HART TUTTLE, OF ATLANTA, GEORGIA.

TIRE-TOOL.

1,302,734.　　　　Specification of Letters Patent.　　Patented May 6, 1919.

Application filed May 31, 1918. Serial No. 237,526.

*To all whom it may concern:*

Be it known that I, MONTAGUE HART TUTTLE, a citizen of the United States, and resident of Atlanta, in the county of Fulton and State of Georgia, have invented certain new and useful Improvements in Tire-Tools, of which the following is a specification.

My invention relates to improvements in tools for removing tires from and replacing them upon rims of wheels, such as automobile tires. One of the objects of my invention is to provide a simple and light tool of the character specified having ample leverage for quickly and easily removing and replacing the tires and without injury to them.

My invention comprises novel details of improvement and combinations of parts that will be more fully hereinafter set forth and then pointed out in the claims.

Reference is to be had to the accompanying drawings forming part hereof, wherein:

Figure 1 is a side view of a portion of a wheel and tire showing my improved tool upon the tire; Fig. 2 is a cross section on the line 2, 2, in Fig. 1, showing the tool in position on the tire for removing it from the rim; Fig. 3 is a view substantially similar to Fig. 2 showing the tire partly removed from the rim; Fig. 4 is an edge view illustrating another position of a tool and tire in the removal of the latter from the rim, and Fig. 5 is a view similar to Fig. 4, showing the tool in position for applying the tire upon the rim.

Similar numerals of reference indicate corresponding parts in the several views.

In the drawings the numeral 1 indicates spokes, 2 a felly and 3 the rim of a wheel adapted to receive a tire 4, which is shown of the pneumatic variety having outer shoe 5 and inner tube 6. The beads of the shoe are adapted to coöperate with the marginal portions of the rim 3 in an ordinary manner. My improved tool comprises two main members pivotally connected together, one of which members has a relatively long handle portion 7 and a jaw 8 suitably curved and adapted to operate against one side of the tire, and the other member of the tool is provided with a relatively long depending member 9 adapted to coöperate with the spokes, and a jaw 10 and curved similarly to the jaw 8 and spaced therefrom to operate against the side of the tire opposite jaw 8. Said members are pivotally connected at 11, whereby when spread apart they may be placed over the tire or shoe, as illustrated in Fig. 2, and are adapted to grip the same therebetween when operated. The jaws 8 and 10 are respectively provided at their free ends with lateral projections $8^a$, $10^a$, which may extend on opposite sides of the corresponding jaw and are preferably curved substantially to correspond with the curvature of rim 3, as shown in Fig. 1, and thereby corresponding substantially to the curvature of the bead of the shoe to fit snugly thereagainst. The free end of member 9 is provided with a lateral foot or projection $9^a$ shown extending on opposite sides and adapted to bear against two adjacent spokes when the tool is applied for removing the tire from the rim. The jaw 10 is provided with a cam-like projection 12 spaced a suitable distance from the free end of the jaw, which cam-like projection is adapted to coöperate with the rim during removal of the tire therefrom.

My improved tool may be made of suitable metal and of dimensions appropriate for the size of tire to be handled. When it is desired to remove a deflated tire from a wheel rim my improved tool is opened so that the jaws 8 and 10 will be spread apart to receive the shoe between them. The jaws are then pressed down and closed together and operated in such a manner as to cause their free ends and the projections $8^a$, $10^a$ thereof to enter between the margins of the rim and the shoe, to present said ends of the jaws against the beads of the shoe whereby the cam-like projection 12 will coöperate with the rim substantially as shown in Fig. 2, and the foot $9^a$ will oppose the spokes of the wheel. The operator will then pull upon handle 7 in the direction of the arrow in Fig. 2, whereby the foot $9^a$ of member 9 of the tool will bear against the spokes as a fulcrum point, and the jaws 8, 10 will be caused to grip the shoe, whereupon projections $8^a$, $10^a$ will squeeze the beads of the shoe toward each other and will release them from the flanges of the rim. During such pull upon the handle 7 the cam-like projection 12 will ride along the edge of rim 3, and thereby the tool will be caused to rise from the rim to correspondingly raise the adjacent portion of the shoe, substantially as illustrated in Fig. 3, whereby the beads of the shoe will be raised above the flanges. Continued movement of member 7 and the tool in the direction stated will cause the adjacent portion of the shoe to be withdrawn off the rim and to one side thereof, substantially as indicated in Fig. 4, whereupon the shoe may be entirely removed from the wheel and the tool may be removed from the shoe. In case any other portion of the tire adheres tightly to the rim the tool may be adjusted upon the tire to such portion, and the operation described may be repeated, and soon as may be necessary to release the tire that is rusted to the rim.

When it is desired to apply the tire upon the wheel the tire may be partially fitted to the rim in an ordinary manner, and the position of the tool may be reversed from that described with respect to removing the tire from the wheel, and the jaws 8, 10 will be applied to the tire and the foot 9ª will be applied on the opposite side of the wheel, in manner substantially as illustrated in Fig. 5, at the portion of the tire not then on the rim. By now forcing the handle member 7 of the tool in the direction of the arrow in Fig. 5, the shoe will be firmly gripped between the jaws of the tool, and by reason of the leverage action the foot 9ª, acting as a fulcrum point upon the wheel, the adjacent portion of the tire may be easily forced over the rim to place it thereon, and then the tool may be removed from the tire.

My improved tool is simple in construction and operation, and will be of great assistance to all who have to remove or replace rubber tires, as the operation may be performed quickly and easily and without requiring application of the hands to the tire to lift it over the rim.

While I have illustrated my tool as useful in connection with the well known type of clenched tire and rim, it will be understood that the tool also may be used for removing clencher tires from automobiles having demountable rims provided with removable rings for retaining the rims in place, since sometimes such rings become rusted in place and it is difficult to remove them while the tire is on the rim. Therefore, my improved tool may be used to lift a portion of the tire over such ring free from the rim.

By means of my improvements the requirement to use tools such as screw drivers, chisels, hammers and the like for removing tires from or applying them upon rims, which has been customary, with consequent injury to the tires, is obviated.

Having now described my invention what I claim is:

1. A tire tool comprising a plurality of members pivotally connected together and respectively having opposing jaws to receive a tire therebetween, one of said members comprising an operating handle portion and the other member having a portion to coöperate with a wheel as a fulcrum to cause the tool to lift the adjacent portion of the tire over the wheel rim.

2. A tire tool comprising a pair of members pivotally connected together and having opposing jaws to grip a tire therebetween, one of said members comprising a handle portion and the jaw of the other member having a cam-like projection spaced from its free end adapted to engage a rim to cause the tire to be lifted therefrom when the handle is pulled.

3. A tire tool comprising a plurality of members pivotally connected together and respectively having opposing jaws to receive a tire therebetween, one of said members comprising an operating handle portion, and one of said jaws having a projection to coöperate with a rim to cause the tire to be raised therefrom when the handle portion is pulled, said jaw having a member on the side opposite said projection to coöperate with a wheel as a fulcrum to cause the tool to lift the adjacent portion of the tire over the rim.

4. A tire tool comprising a pair of members pivotally connected together and having a pair of opposing jaws to receive a tire therebetween, the free ends of said jaws being provided with lateral projections adapted to coöperate with the beads of the tire, one of said jaws having a projection to coöperate with a wheel rim, and the other jaw having a handle-like projection for operation of the tool.

5. A tire tool comprising a pair of members pivotally connected together and having a pair of opposing jaws to receive a tire therebetween, the free ends of said jaws being provided with lateral projections adapted to coöperate with the beads of the tire, one of said jaws having a projection to coöperate with a wheel rim, and having on the other side an extending member provided with a foot adapted to coöperate with the spokes of the wheel, and the other jaw having a handle-like portion for operation of the tool.

Signed at Atlanta, in the county of Fulton and State of Georgia, this 25th day of May, A. D. 1918.

MONTAGUE HART TUTTLE.

Witnesses:
R. W. CRENSHAW,
BYRON A. WOODRUFF.